(12) United States Patent
Jeon et al.

(10) Patent No.: US 11,469,477 B2
(45) Date of Patent: Oct. 11, 2022

(54) BATTERY PACK

(71) Applicant: Samsung SDI Co., Ltd., Yongin-si (KR)

(72) Inventors: Doo Sung Jeon, Yongin-si (KR); Wun Seok Jeong, Yongin-si (KR); Dong Jin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 459 days.

(21) Appl. No.: 16/464,655

(22) PCT Filed: Oct. 20, 2017

(86) PCT No.: PCT/KR2017/011643
§ 371 (c)(1),
(2) Date: May 28, 2019

(87) PCT Pub. No.: WO2018/105883
PCT Pub. Date: Jun. 14, 2018

(65) Prior Publication Data
US 2019/0386281 A1 Dec. 19, 2019

(30) Foreign Application Priority Data
Dec. 7, 2016 (KR) .......................... 10-2016-0165789

(51) Int. Cl.
| *H01R 13/506* | (2006.01) |
| *H01M 50/502* | (2021.01) |
| *H01M 50/20* | (2021.01) |

(52) U.S. Cl.
CPC ......... *H01M 50/502* (2021.01); *H01M 50/20* (2021.01); *H01R 13/506* (2013.01)

(58) Field of Classification Search
CPC .... H01M 50/502; H01M 50/20; H01M 50/50; H01M 2220/20; H01M 50/543;
(Continued)

(56) References Cited

U.S. PATENT DOCUMENTS

| 6,340,877 B1 * | 1/2002 | Mita ....................... B60L 58/21 |
| | | 320/112 |
| 9,105,912 B2 | 8/2015 | Zhao |

(Continued)

FOREIGN PATENT DOCUMENTS

| CN | 101926025 | * 12/2010 | |
| CN | 102655336 A | * 9/2012 | ............. H01H 9/085 |

(Continued)

OTHER PUBLICATIONS

Extended European Search Report for corresponding European Patent Application No. 17877565.6, dated Jun. 12, 2020, 9 pages.
(Continued)

*Primary Examiner* — Kaity V Chandler
(74) *Attorney, Agent, or Firm* — Lewis Roca Rothgerber Christie LLP

(57) ABSTRACT

An embodiment of the present invention relates to a coupling structure of a battery pack, and the objective of the present invention is to provide a battery pack which can stably and easily fix a bus bar. To this end, provided is a battery pack comprising: a base defining the entire bottom surface; a battery module installed on the base; a module fixing part positioned around a side surface and an upper surface of the battery module and coupled to the base; a first bus bar fixing part coupled to the module fixing part; a bus bar disposed on the first bus bar fixing part and electrically connectable to the battery module; and a second bus bar fixing part installed to cover the bus bar and fixed to the first bus bar fixing part.

8 Claims, 4 Drawing Sheets

(58) Field of Classification Search
CPC ............. H01M 10/482; H01M 10/613; H01M 10/425; H01M 10/625; H01M 10/0525; H01M 50/531; H01M 50/572; H01M 50/10; H01M 10/48; H01M 10/486; H01M 50/209; H01M 2010/4271; H01M 10/647; H01M 50/147; H01M 50/172; H01M 50/54; H01M 2200/103; H01M 50/528; H01M 50/116; H01M 10/6556; H01M 50/24; H01M 50/581; H01M 10/653; H01M 50/30; H01M 10/643; H01M 10/6551; H01M 50/213; H01M 10/052; H01M 50/529; H01M 10/6557; H01M 50/103; H01M 50/3425; H01M 10/4207; H01M 2200/20; H01M 2220/30; H01M 50/183; H01M 50/578; H01M 2200/00; H01M 10/6567; H01M 10/6553; H01M 2220/10; H01M 50/538; H01M 10/04; H01M 50/557; H01M 10/0431; H01M 2010/4278; H01M 10/058; H01M 10/42; H01M 10/6563; H01M 50/166; H01M 10/658; H01M 50/35; H01M 10/0481; H01M 10/6561; H01M 50/561; H01M 10/0422; H01M 50/308; H01M 50/541; H01M 10/12; H01M 10/6566; H01M 50/15; H01M 10/655; H01M 50/579; H01M 10/617; H01M 10/6568; H01M 50/107; H01M 10/615; H01M 50/124; H01M 6/42; H01R 13/506; Y02E 60/10

See application file for complete search history.

(56) References Cited

U.S. PATENT DOCUMENTS

| | | | |
|---|---|---|---|
| 9,431,811 | B2 | 8/2016 | Takishita et al. |
| 9,502,706 | B2* | 11/2016 | Ishibashi ............ H01M 50/296 |
| 10,243,181 | B2 | 3/2019 | Zhao et al. |
| 10,381,679 | B2* | 8/2019 | Choi .................. H01M 50/271 |
| 2011/0064986 | A1 | 3/2011 | Ogasawara et al. |
| 2012/0094155 | A1* | 4/2012 | Lim ...................... H01M 50/30 |
| | | | 429/82 |
| 2013/0130071 | A1* | 5/2013 | Adachi ................ H01M 50/35 |
| | | | 429/61 |
| 2013/0309537 | A1 | 11/2013 | Zhao |
| 2014/0127555 | A1* | 5/2014 | Ishibashi ............ H01M 50/502 |
| | | | 429/160 |
| 2014/0311768 | A1 | 10/2014 | Takishita et al. |
| 2015/0221915 | A1 | 8/2015 | Burkman et al. |
| 2016/0301048 | A1 | 10/2016 | Zhao et al. |
| 2016/0351882 | A1* | 12/2016 | Wetzel ............... H01M 50/502 |
| 2017/0244139 | A1* | 8/2017 | Tononishi ........... H01M 10/482 |
| 2018/0342717 | A1* | 11/2018 | Shoji ...................... B60L 50/64 |

FOREIGN PATENT DOCUMENTS

| | | | | |
|---|---|---|---|---|
| CN | 103545467 | A * | 1/2014 | ......... H01M 2/1077 |
| CN | 103975459 | A * | 8/2014 | ............. B60L 1/003 |
| CN | 203797158 | U | 8/2014 | |
| CN | 204187139 | U | 3/2015 | |
| CN | 104752650 | A | 7/2015 | |
| CN | 204760437 | U | 11/2015 | |
| CN | 105351630 | A | 2/2016 | |
| CN | 205047994 | U | 2/2016 | |
| EP | 2 669 972 | A1 | 12/2013 | |
| JP | 2011023179 | A * | 2/2011 | ............ H01M 10/50 |
| JP | 2014013687 | A * | 1/2014 | .............. H01M 2/30 |
| JP | 2015022798 | A * | 2/2015 | .............. H01M 2/20 |
| JP | 2015-106531 | A | 6/2015 | |
| JP | 5934520 | B2 | 6/2016 | |
| KR | 10-2011-0044130 | A | 4/2011 | |
| KR | 10-2012-0005727 | A | 1/2012 | |
| KR | 10-2014-0060633 | A | 5/2014 | |
| KR | 10-1477548 | B1 | 12/2014 | |
| WO | WO-2008106641 | A1 * | 9/2008 | ............ H01M 10/48 |
| WO | WO-2015005147 | A1 * | 1/2015 | .......... H01M 10/425 |

OTHER PUBLICATIONS

CN Office action issued in corresponding application No. 201780073570.5, dated Jun. 3, 2021, 6 pages.
Chinese Office action issued in corresponding application No. CN 201780073570.5, dated Dec. 29, 2021, 7 pages.

* cited by examiner

BATTERY PACK

CROSS-REFERENCE TO RELATED APPLICATION(S)

This application is a National Phase Patent Application of International Patent Application Number PCT/KR2017/011643, filed on Oct. 20, 2017, which claims priority of Korean Patent Application No. 10-2016-0165789, filed Dec. 7, 2016. The entire contents of both of which are incorporated herein by reference.

TECHNICAL FIELD

Embodiments of the present invention relate to a coupling structure of a battery pack.

BACKGROUND ART

A battery pack for driving an electric vehicle or the like includes a plurality of battery modules. The battery modules may be electrically connected to various battery management systems provided in the battery pack, and the plurality of battery modules may be connected to each other in series or in parallel. Electrical connections of the battery modules are performed using bus bars.

However, if the bus bars are not stably fixed at given locations, for example, if the bus bars are shaken by vibration of an automobile to then be electrically disconnected or damaged by an impact due to the vibration to then be short-circuited, resulting in a major accident, such as outbreak of a fire. In particular, in a case where battery modules to be connected by means of a bus bar are far from each other and the bus bar needs to be extended long, a mid portion of the bus bar may be readily shaken. Accordingly, a need for stably fixing the bus bar is further increased.

The above information disclosed in this Background section is only for enhancement of understanding of the background of the described technology and therefore it may contain information that does not form the prior art that is already known in this country to a person of ordinary skill in the art.

Technical Problems to be Solved

Embodiments of the present invention provide a battery pack which can stably and easily fix a bus bar.

Technical Solutions

In accordance with an aspect of the present invention, the above and other objects can be accomplished by providing a battery pack including a base defining the entire bottom surface, a battery module installed on the base, a module fixing part positioned around a side surface and an upper surface of the battery module and coupled to the base, a first bus bar fixing part coupled to the module fixing part, a bus bar disposed on the first bus bar fixing part and electrically connectable to the battery module, and a second bus bar fixing part installed to cover the bus bar and fixed to the first bus bar fixing part.

The second bus bar fixing part may be rotatably connected to the first bus bar fixing part and may be capable of rotating to cover the bus bar disposed on the first bus bar fixing part.

In addition, hook coupling means for coupling the first bus bar fixing part and the second bus bar fixing part to each other may be formed by hook coupling at second end sides opposite to first end sides rotatably connected together.

In addition, the bus bar may include a plurality of bus bars positioned on the first bus bar fixing part to be spaced apart from each other, and hook coupling means may further be positioned at locations on the first bus bar fixing part and the second bus bar fixing part, the locations corresponding to portions between each of the plurality of bus bars.

In addition, grooves sized to correspond to widths of the bus bars may be positioned at the locations of the first bus bar fixing part, where the bus bars are disposed.

In addition, the module fixing part may be shaped of a band having opposite ends coupled to the base and a mid portion around two opposite side surfaces and an upper surface of the battery module.

In addition, the module fixing part and the first bus bar fixing part may be coupled to each other by hook coupling.

In addition, the base and the module fixing part may be coupled to each other by bolt coupling.

Advantageous Effects

As described above, embodiments of the present invention provide a battery pack, which can stably fix a bus bar at a given location by fixing a battery module to a base using a module fixing part and fixing the bus bar to the module fixing part using a first bus bar fixing part and a second bus bar fixing part.

In addition, the bus bar can be easily fixed by rotatably connecting a first end side of the second bus bar fixing part to the first bus bar fixing part and coupling a second end side of the second bus bar fixing part to the first bus bar fixing part by hook coupling.

BEST MODE FOR CARRYING OUT THE INVENTION

Figure 1:
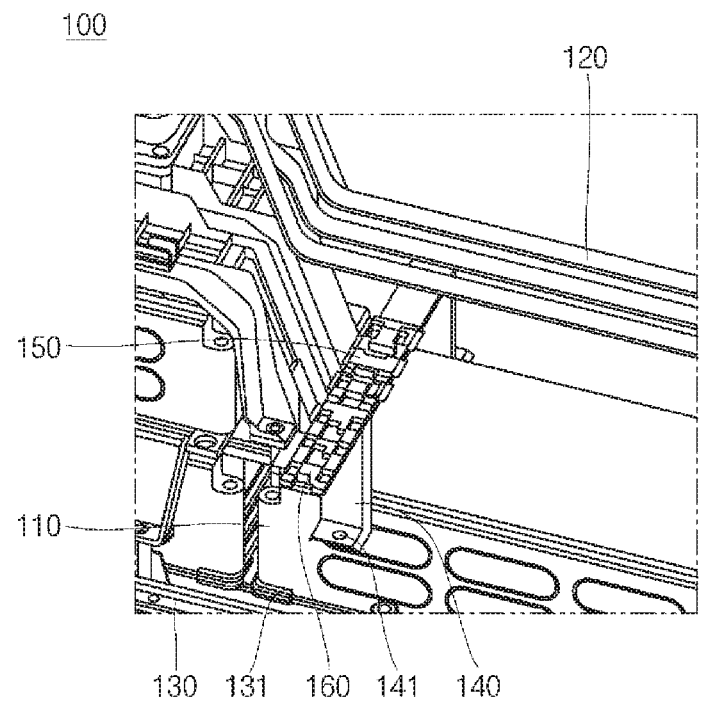
FIGS. 1 to 3 are perspective views illustrating a process of assembling a battery pack according to an embodiment of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity.

Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
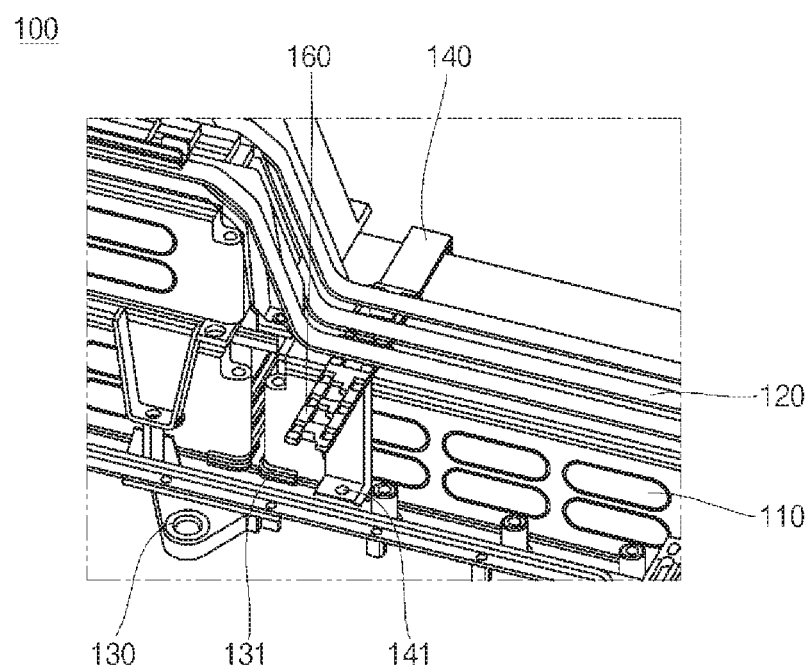
Figure 3:
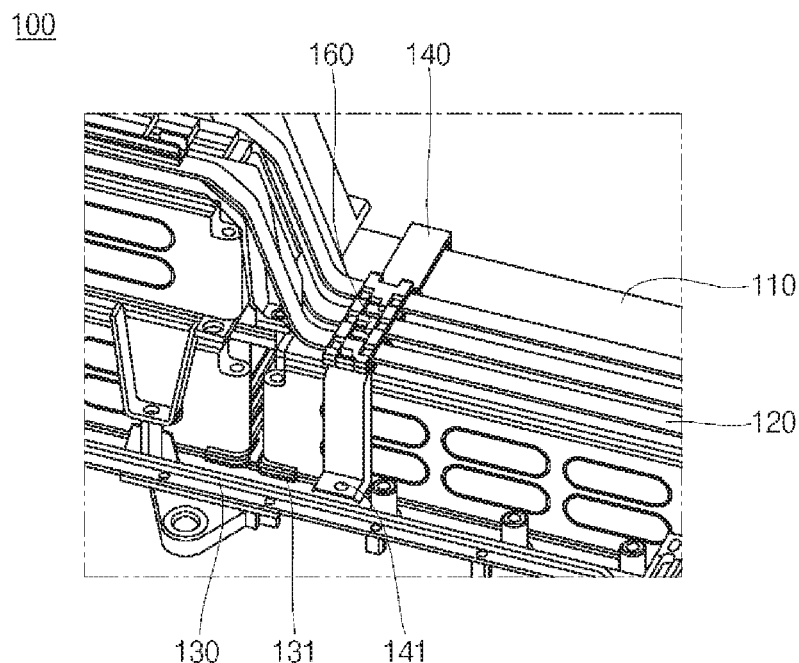
Figure 4:
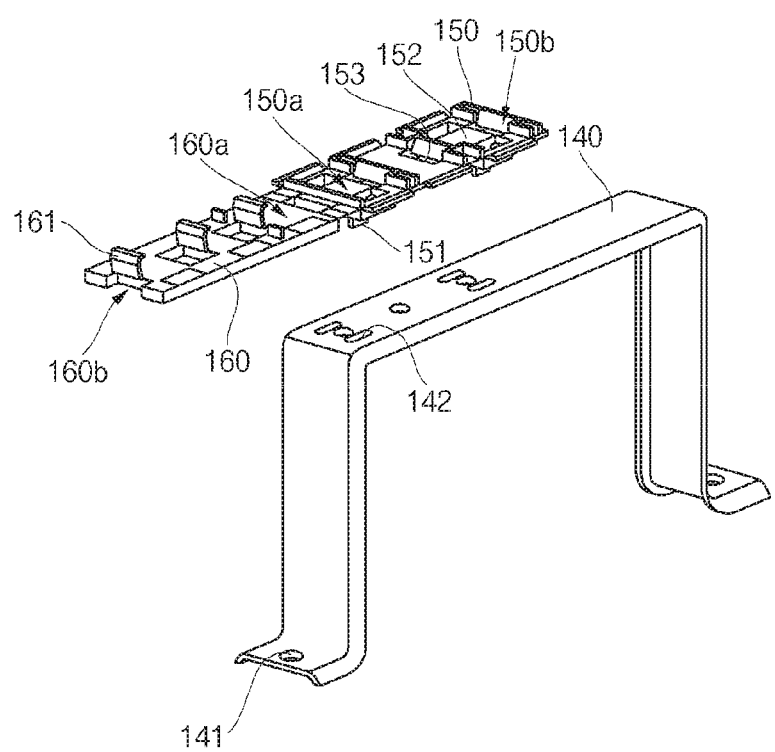
FIGS. 4 and 5 are perspective views illustrating a process of assembling a module fixing part, a first bus bar fixing part and a second bus bar fixing part in the battery pack according to an embodiment of the present invention.
Figure 5:
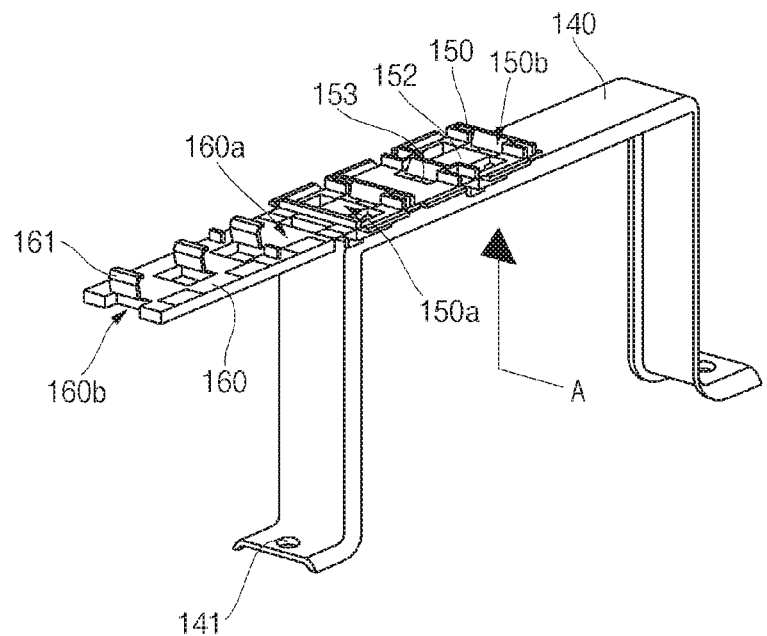
Figure 6:
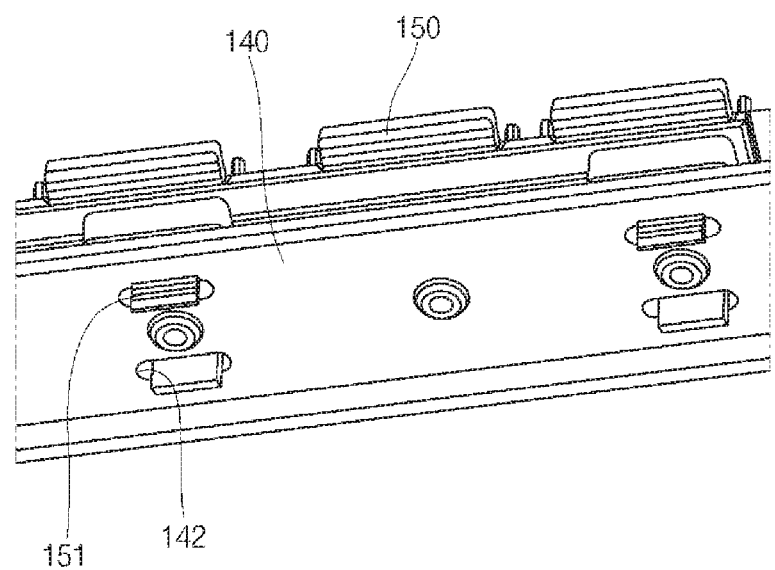
FIG. 6 is a partly enlarged view illustrating a state in which the module fixing part and the first bus bar fixing part are coupled to each other in a direction indicated by an arrow A in FIG. 5.
Figure 7:
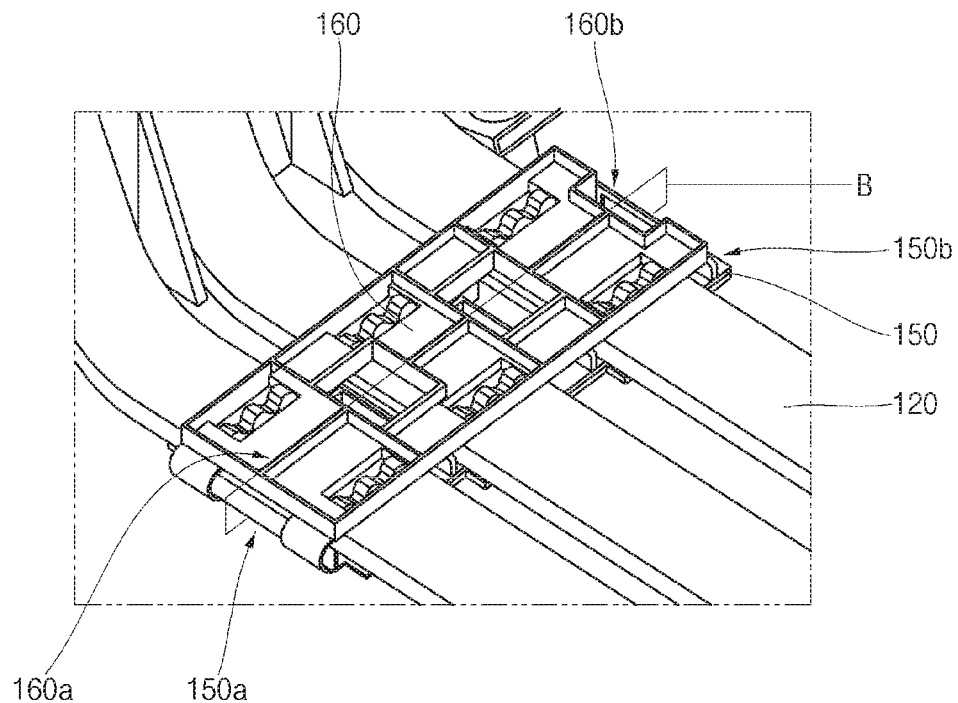
FIG. 7 is a partly enlarged view illustrating a state in which bus bars, the first bus bar fixing part and the second bus bar fixing part are coupled to one another in the battery pack according to an embodiment of the present invention.
Figure 8:
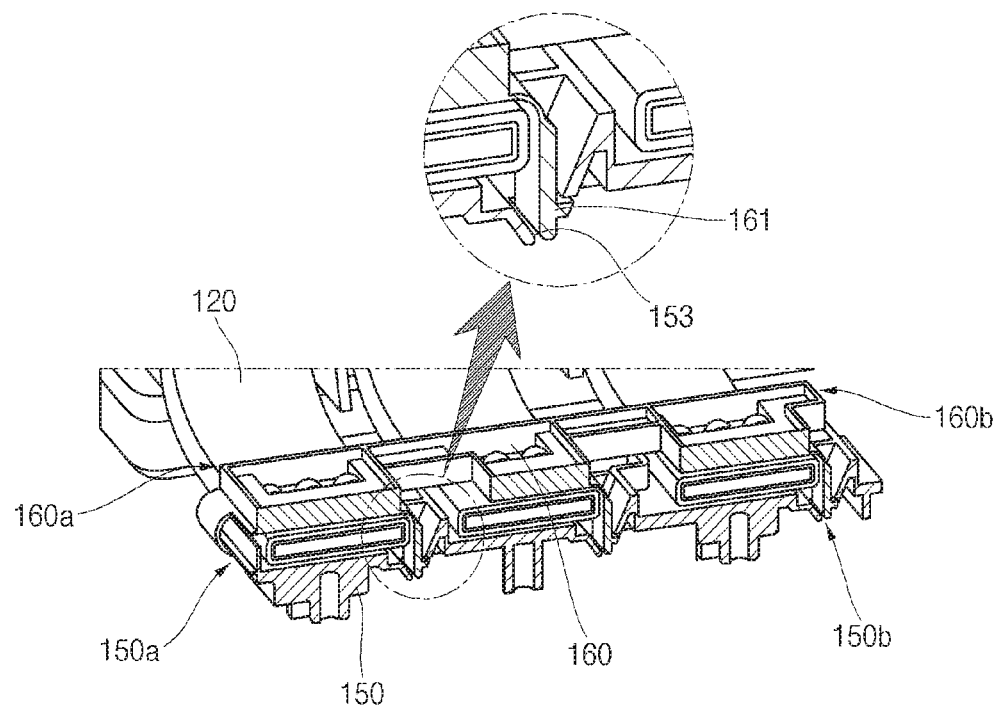
FIG. 8 is a cross-sectional view on a plane B of FIG. 7.

FIGS. 1 to 3 are perspective views illustrating a process of assembling a battery pack 100 according to an embodiment of the present invention, FIGS. 4 and 5 are perspective views illustrating a process of assembling a module fixing part 140, a first bus bar fixing part 150 and a second bus bar fixing part 160 in the battery pack 100 according to an embodiment of the present invention, FIG. 6 is a partly enlarged view illustrating a state in which the module fixing part 140 and the first bus bar fixing part 150 are coupled to each other in a direction indicated by an arrow A in FIG. 5, FIG. 7 is a partly enlarged view illustrating a state in which bus bars 120, the first bus bar fixing part 150 and the second bus bar fixing part 160 are coupled to one another in the battery pack 100 according to an embodiment of the present invention, and FIG. 8 is a cross-sectional view on a plane B of FIG. 7.

Referring to FIGS. 1 to 8, the battery pack 100 includes a battery module 110, bus bars 120, a base 130, a module fixing part 140, a first bus bar fixing part 150 and a second bus bar fixing part 160.

The battery module 110 is configured such that a plurality of battery cells (not shown) are connected to each other in series or in parallel. Here, each of the battery cells may have a general configuration in which an electrode assembly, including a separator interposed between a positive electrode and a negative electrode, is impregnated in an electrolyte.

In addition, the bus bar 120 may electrically connect the battery module 110 and various battery management systems (not shown) provided in the battery pack 100 or may connect a plurality of battery modules 110 to each other in series or in parallel.

Since the battery module 110 and the bus bar 120 are the same as publicly known in the art, detailed descriptions thereof will not be given.

The base 130 establishes an overall bottom surface of the battery pack 100. The plurality of battery modules 110 are positioned on the base 130. In order to define a region where the battery modules 110, as shown in FIGS. 1 to 3, protrusions 131 may be positioned along at least some portions of bottom edges of the battery modules 110 or grooves may be positioned to have shapes corresponding to bottom surfaces of the battery modules 110.

In addition, bolt holes are positioned in the base 130 to be coupled with the module fixing part 140 using bolts.

The module fixing part 140 is positioned around one or more side surfaces and an upper surface of the battery module 110. Here, the module fixing part 140 is shaped of a band, as shown in FIGS. 1 to 3, around two opposite side surfaces and the upper surface of the battery module 110. In addition, the module fixing part 140 may be positioned around two adjacent side surfaces and the upper surface of the battery module 110. Moreover, the module fixing part 140 may also be positioned around one side surface and the upper surface of the battery module 110 or three or more side surfaces and the upper surface of the battery module 110. In the following description, however, a case where the module fixing part 140 is positioned in such a manner as shown in FIGS. 1 to 3 will be described by way of example.

In addition, as described above, the module fixing part 140 is coupled to the base 130 using the bolts. To this end, bolt holes 141 to be engaged with the bolts are positioned in the module fixing part 140. Here, the bolts are just provided by way of example for coupling means of the base 130 and the module fixing part 140. However, aspects of the present invention do not preclude coupling of the base 130 and the module fixing part 140 using other coupling means, such as hooks.

In addition, hook grooves 142 for coupling the first bus bar fixing part 150 by, for example, hook coupling, are positioned in the module fixing part 140. FIG. 4 illustrates the hook grooves 142 positioned in portions of the module fixing part 140, corresponding to the upper surface of the battery module 110, which is simply assumed that the bus bar 120 is disposed on the entire upper surface of the battery module 110, however. Therefore, if the bus bar 120 is disposed on the side surfaces of the battery module 110, the hook grooves 142 will be positioned in portions of the module fixing part 140, corresponding to the side surfaces of the battery module 110.

As described above, the first bus bar fixing part 150 is coupled to the module fixing part 140 by hook coupling. To this end, hook protrusions 151 to be coupled with the hook grooves 142 of the module fixing part 140 are positioned on a surface brought into contact with the module fixing part 140 of the first bus bar fixing part 150, that is, a bottom surface of the first bus bar fixing part 150. Alternatively, hook protrusions may be positioned on the module fixing part 140, and hook grooves may be positioned in the first bus bar fixing part 150. Here, the hook coupling means are just provided by way of example as means for coupling the module fixing part 140 and the first bus bar fixing part 150. However, aspects of the present invention do not preclude coupling of the module fixing part 140 and the first bus bar fixing part 150 using other coupling means, such as bolts.

In addition, a plurality of bus bars 120 are disposed on the upper surface of the first bus bar fixing part 150. Here, in order to define locations where the bus bars 120 are disposed, accommodation grooves 152 corresponding to widths of the bus bars 120 may be positioned in the first bus bar fixing part 150.

In addition, hook grooves 153 for coupling the second bus bar fixing part 160 by, for example, hook coupling, are positioned in the first bus bar fixing part 150.

A first end side 160a of the second bus bar fixing part 160 is rotatably connected to a first end side 150a of the first bus bar fixing part 150. To this end, the first bus bar fixing part 150 and the second bus bar fixing part 160 may be connected to each other to be foldable by means of a hinge or to be bendable using a highly elastic or tensile material.

In addition, the second bus bar fixing part 160 is rotated to overlap the first bus bar fixing part 150, and the second bus bar fixing part 160 is coupled to the first bus bar fixing part 150 by hook coupling, as described above. To this end, hook protrusions 161 to be coupled to the hook grooves 153 of the first bus bar fixing part 150 are positioned on a surface of the second bus bar fixing part 160, facing the upper surface of the first bus bar fixing part 150. The hook coupling means may be positioned on second sides 150b and 160b opposite to the first sides 150a, 160a of the first bus bar fixing part 150 and the second bus bar fixing part 160, respectively. In addition, if the plurality of bus bars 120 are disposed to be spaced apart from each other, the hook coupling means may further be positioned at locations corresponding to portions between each of the plurality of bus bars 120, as shown in FIG. 8. That is to say, the hook grooves 153 may further be positioned at the locations the first bus bar fixing part 150, corresponding to portions between each of the plurality of bus bars 120, and the hook protrusions 161 may further be positioned at the locations of the second bus bar fixing part 160, corresponding to portions between each of the plurality of bus bars 120. Alternatively, hook protrusions may be positioned in the first bus bar fixing part 150, and hook grooves may be positioned in the second bus bar fixing part 160. Here, the hook coupling means are just provided by way of example as means for coupling the first bus bar fixing part 150 and the second bus bar fixing part 160. However, aspects of the present invention do not preclude coupling of the first bus bar fixing part 150 and the second bus bar fixing part 160 using other coupling means, such as bolts.

Based on the above-described configurations of the battery module 110, a process of assembling the battery pack 100 will now be described.

First, referring to FIG. 1, the battery module 110 is installed on the base 130. Here, if the battery module 110 is disposed in a region defined by protrusions 131 positioned on the base 130, movement of the battery module 110 can be prevented, thereby more stably installing the battery module 110.

Thereafter, the module fixing part 140 is installed around the side surfaces and upper surface of the battery module 110, thereby coupling the module fixing part 140 to the base 130. Here, bolt holes of the base 130 coincide with the bolt holes 141 of the module fixing part 140 to fasten bolts with the bolt holes 132 and 141, thereby coupling the module fixing part 140 to the base 130. Accordingly, the battery module 110 can be stably fixed to the base 130. However, as described above, the module fixing part 140 may be coupled to the base 130 using coupling means other than the bolts, when necessary.

Then, the first bus bar fixing part 150 is coupled to the module fixing part 140. Here, hook protrusion 151 of the first bus bar fixing part 150 are received in the hook grooves 142 of the module fixing part 140, thereby easily coupling the first bus bar fixing part 150 to the module fixing part 140. However, when necessary, as described above, the first bus bar fixing part 150 may be coupled to the module fixing part 140 using coupling means other than hook coupling.

Finally, the bus bars 120 are disposed in the first bus bar fixing part 150 and the second bus bar fixing part 160 is rotated to cover the bus bars 120, thereby coupling the second bus bar fixing part 160 to the first bus bar fixing part 150. Accordingly, the bus bars 120 are stably and easily fixed at predetermined locations, thereby preventing the bus bars 120 from moving due to vibration and from being damaged by an impact due to the vibration. However, as described above, the second bus bar fixing part 160 may also be coupled to the first bus bar fixing part 150 using coupling means other than hook coupling, when necessary.

Although the foregoing embodiments have been described to practice the battery pack of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A battery pack comprising:
a base defining a bottom surface;
a battery module installed on the base;
a module fixing part positioned around a side surface and an upper surface of the battery module and coupled to the base so that the battery module is fixed to the base;
a first bus bar fixing part coupled to the module fixing part;
a bus bar disposed on the first bus bar fixing part and electrically connectable to the battery module; and
a second bus bar fixing part installed to cover the bus bar and fixed to the first bus bar fixing part,
wherein the bus bar extends past both sides of each of the module fixing part and the first bus bar fixing part in a plan view.

2. The battery pack of claim 1, wherein the second bus bar fixing part is movably connected to the first bus bar fixing part and is capable of rotating to cover the bus bar disposed on the first bus bar fixing part.

3. The battery pack of claim 2, wherein hook coupling means for coupling the first bus bar fixing part and the second bus bar fixing part to each other are formed by hook coupling at second sides of the first bus bar fixing part and the second bus bar fixing part that are opposite to first sides of the first bus bar fixing part and the second bus bar fixing part, the first sides of the first bus bar fixing part and the second bus bar fixing part being movably connected together.

4. The battery pack of claim 3, wherein the bus bar includes a plurality of bus bars positioned on the first bus bar fixing part to be spaced apart from each other, and hook coupling means are further positioned at locations on the first bus bar fixing part and the second bus bar fixing part, the locations corresponding to portions between each of the plurality of bus bars.

5. The battery pack of claim 1, wherein grooves sized to correspond to widths of the bus bars are positioned at locations of the first bus bar fixing part, where the bus bars are disposed.

6. The battery pack of claim 1, wherein the module fixing part is shaped as a band having opposite ends coupled to the base and having a mid portion around two opposite side surfaces and an upper surface of the battery module.

7. The battery pack of claim 1, wherein the module fixing part and the first bus bar fixing part are coupled to each other by hook coupling.

8. The battery pack of claim 1, wherein the base and the module fixing part are coupled to each other by bolt coupling.

* * * * *